United States Patent

Colarelli, III et al.

[19]

[11] Patent Number: 6,163,968
[45] Date of Patent: Dec. 26, 2000

[54] STEERING LASH AND SUSPENSION PLAY TESTING SYSTEM

[75] Inventors: Nicholas J. Colarelli, III, Creve Coeur; Paul G. Marting, Chesterfield, both of Mo.

[73] Assignee: Hunter Engineering Co, Bridgeton, Mo.

[21] Appl. No.: 09/253,641

[22] Filed: Feb. 19, 1999

[51] Int. Cl.[7] .............................. G01B 5/24; B60Q 1/42; G01C 17/38

[52] U.S. Cl. ................................ 33/203.14; 33/203.18; 33/288; 116/31; 73/1.75; 73/1.79

[58] Field of Search ..................... 33/1 N, 1 PT, 33/203.14, 534, 203.18, 288; 116/31; 73/1.75, 1.79

[56] References Cited

U.S. PATENT DOCUMENTS

| | | | |
|---|---|---|---|
| Re. 33,144 | 1/1990 | Hunter et al. | 33/388 |
| 3,270,708 | 9/1966 | Freed | 116/31 |
| 3,556,045 | 1/1971 | Williams | 116/31 |
| 4,319,838 | 3/1982 | Grossman et al. | 33/288 |
| 4,574,490 | 3/1986 | Curchod | 33/203.18 |
| 5,174,425 | 12/1992 | Takahashi et al. | 73/1.75 |
| 5,257,428 | 11/1993 | Koerner | 33/203.18 |
| 5,488,471 | 1/1996 | McClenahan et al. | 33/203.18 |
| 5,488,472 | 1/1996 | January | 33/288 |
| 5,489,983 | 2/1996 | McClenahan et al. | 33/203.18 |
| 5,522,139 | 6/1996 | Rossato | 33/1 PT |
| 5,610,577 | 3/1997 | Hwang | 116/31 |
| 5,675,515 | 10/1997 | January | 33/288 |
| 5,724,128 | 3/1998 | January | 33/203.18 |

*Primary Examiner*—Randy W. Gibson
*Attorney, Agent, or Firm*—Gregory E. Upchurch; Thompson Coburn LLP

[57] ABSTRACT

Steering wheel lash and suspension play are checked by comparing predefined movements of the steering wheel and the road wheels. A steering wheel fixture adapted to be mounted to the steering wheel particularly facilitates the steering wheel lash determination. Quickly mountable and removable road wheel angle sensors also facilitate the method.

40 Claims, 7 Drawing Sheets

STEERING LASH AND SUSPENSION PLAY TESTING SYSTEM

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to vehicle wheel alignment, and more particularly to systems for rapidly and reliably testing steering lash and suspension play.

Tests are known for checking steering wheel lash and suspension play. These tests are predominantly manual, not particularly accurate and relatively time consuming. For example, a standard suspension play test requires hoisting the vehicle, applying the brake to eliminate wheel bearing movement, manually grasping the front and rear of one of the front tires and attempting to move the wheel/tire assembly right and left without moving the steering gear. If the measured movement at the front or rear of the tire is greater than a predetermined amount (such as ¼ inch), then the test is failed. Note that if the tire is grasped at the front and the rear as directed, it is at least inconvenient for a single user to also measure the movement of the wheel/tire assembly.

Standard tests for steering wheel lash are similarly deficient. For example, one such procedure reads:

"With road wheels in straight ahead position, turn steering wheel until motion can be detected at the front wheels. Align a reference mark on steering wheel with a mark on a ruler and slowly turn steering wheel in the opposite direction until motion can again be detected at the front road wheel. Measure lash at steering wheel. Special lash-checking instruments are also available, measuring free play in inches or degrees. Such instruments should always be mounted and used according to the manufacturer's instructions.

"Reject Vehicle: If steering wheel movement exceeds:

Power—2 inches (51 mm)

Manual—3 inches (76 mm)"

Note that this procedure requires detecting motion at the front road wheels, which is difficult to do accurately without instruments, while at the same time one is turning the steering wheel. The user must also measure, with a ruler or with a lash-checking instrument, the movement of the steering wheel during the procedure. As can be readily be appreciated, this procedure is slow, inaccurate and may require more than one person to perform properly.

A method for monitoring ball joint wear is shown in U.S. Pat. No. 4,574,490, but that particular method is fairly limited in the particular defect that it detects and requires both camber and toe to be measured at least twice. This method also requires external forces on the tires, which is not always desirable. The '490 patent also typically requires a fairly highly trained technician to operate.

Also known, although apparently not used in the context of checking steering lash and suspension play, are various systems designed to determine vehicle wheel alignment angles. For example, U.S. Pat. No. Re33,144 to Hunter and January and U.S. Pat. No. 4,319,838 to Grossman and January each describe a wheel alignment system which uses electro-optical transducers to determine the toe alignment angles of a vehicle. FIG. 2 of each of these patents shows six angle transducers carried by support assemblies which are mounted to the vehicle wheels. FIG. 4 of Re33,144 and FIG. 9 of U.S. Pat. No. 4,319,838 show the geometry of this arrangement and illustrate the six angles which are directly measured. These patents further describe (see Re33,144 col. 7 lines 26–39, and U.S. Pat. No. 4,319,838 col. 8 line 63 to col. 9 line 12) how the toe alignment angles are computed from the angles directly measured by the angle transducers. The disclosures of these patents is hereby incorporated herein by reference.

SAE Publication 850219, titled "Steering Geometry and Caster Measurement", by January, derives and discusses the procedures and methods by which toe and camber alignment transducers are used to determine the caster and steering axis inclination (SAI) of a vehicle. The procedures described therein are the industry standard. The disclosure of this publication is hereby incorporated herein by reference.

Equipment of this general type and using the apparatus and methods enumerated above has been used world-wide for many years. Such equipment is capable of determining the camber, caster, and pointing or "toe" alignment angles of the wheels relative to one or more appropriate reference axes, and is sufficient to allow proper adjustment of the alignment so as to reduce tire wear and provide for safe handling. It is believed, however, that such equipment could be improved.

German Patent DE 29 48 573 A1, assigned to Siemens AG, describes the use of cameras to determine the locations and orientations of the wheels of a vehicle. On each side of the vehicle, a single camera is moved to multiple positions to view the vehicle wheels. Alternatively, a single fixed camera is used at each side in conjunction with movable mirrors, or multiple cameras are used. The system examines the images thus viewed of the wheels of the vehicle to determine the locations and orientations of the wheels, from which the wheel alignment parameters are determined.

European Patent Application PCT/US93/08333, filed in the name of Jackson and published under the Patent Cooperation Treaty as WO 94/05969 (hereinafter referred to as WO document 94/05969), describes the use of a camera having one or more defined fields of view to view optical targets of known configurations which are mounted to the vehicle wheels. Through the use of sophisticated image recognition methods, the three dimensional coordinates and orientations of the vehicle wheels and their corresponding axes of rotation are determined. The wheel alignment parameters are determined from these coordinates and orientations. The disclosure of this document is hereby incorporated herein by reference, as are the disclosures of U.S. Pat. Nos. 5,675,515, 5,724,128, 5,489,983, 5,488,472, and 5,488,471.

It is not believed that heretofore such alignment equipment has been considered for use in testing steering lash or suspension play. Moreover, it should be noted that if steering lash or suspension play is excessive it may in fact be very difficult to perform a proper alignment on a vehicle even using these sophisticated alignment techniques shown in the references cited above.

SUMMARY OF THE INVENTION

Among the various objects and features of the present invention may be noted the provision of an improved system and method for testing steering lash.

A second object is the provision of such a system and method for testing suspension play.

A third object is the provision of such a system and method which takes advantage of known apparatus for measuring vehicle alignment angles.

A fourth object is the provision of such a system and method which greatly reduces the amount of error introduced into the testing by manual measurement devices.

A fifth object is the provision of such a system and method which reduces the amount of time required to check both steering lash and suspension play.

A sixth object is the provision of such a system and method which may be accuracy performed by a technician with relatively little training.

Other objects and features will be in part apparent and in part pointed out hereinafter.

Briefly, in a first aspect of the present invention, a method of testing steering wheel lash for acceptability in a vehicle having a steering wheel includes the steps of moving the steering wheel to a predetermined steer ahead angle, and securing a steering angle fixture to the steering wheel, the steering angle fixture having an indicator for indicating whether the steering wheel has been moved a predetermined angle. The method also includes moving the steering wheel to a first rotational position, recording the steer ahead angle at the first rotational position, the steer ahead angle at the first rotational position being a first steer ahead angle, and setting the steering angle fixture at a predetermined fixture position. The steering wheel is then moved to a second rotational position at which the indicator indicates that the steering wheel has been moved the predetermined angle, and the steer ahead angle at the second rotational position is recorded, the steer ahead angle at the second rotational position being a second steer ahead angle. The vehicle is indicated as having excessive steering wheel lash if the difference between the first and second steer ahead angles is less than a predetermined amount.

In a second aspect of the present invention, a method of testing suspension play for acceptability in a vehicle having a steering wheel and two front wheels includes the steps of moving the front wheels to a first predetermined angle, measuring and recording a total toe of the front wheels at the first predetermined angle, moving the front wheels to a second predetermined angle, measuring and recording the total toe of the front wheels at the second predetermined angle, and indicating that the vehicle has excessive suspension play if the difference between the recorded values of the total toe at the first and second predetermined angles is greater than a predetermined value.

In a third aspect of the present invention, a method of determining whether a vehicle is alignable includes the steps of moving the front wheels to a first predetermined wheel angle, measuring and recording a total toe of the front wheels at the first predetermined wheel angle, moving the front wheels to a second predetermined wheel angle, measuring and recording the total toe of the front wheels at the second predetermined wheel angle, and indicating that the vehicle may not be alignable if the difference between the recorded values of the total toe at the first and second predetermined wheel angles is greater than a predetermined value.

In a fourth aspect of the present invention, apparatus for testing steering wheel lash of a vehicle having a steering wheel and first and second front wheels includes a first sensor element adapted to be placed on the first front wheel of the vehicle, a second sensor element adapted to be placed on the second front wheel of the vehicle, and at least one angle computing system responsive to the first and second sensor elements for computation of wheel alignment angles of the first and second front wheels. A steering angle fixture is adapted to be secured to the steering wheel of the vehicle, the steering angle fixture having a first portion which is securable against relative movement with respect to the steering wheel and a second portion which is rotationally adjustable with respect to the first portion. The steering angle fixture further has an indicator for indicating when the steering wheel is moved from a first angular position to a second angular position, the second angular position being predetermined with respect to the first angular position. The second portion of the steering angle fixture is fixable against rotation with respect to the first portion thereof so that the user may set the first angular position.

In a fifth aspect of the present invention, a method of testing steering wheel lash for acceptability in a vehicle having a steering wheel and at least first and second front road wheels includes the steps of securing a steering angle sensing element to the steering wheel, the steering angle sensing element being adapted to determine change in the steering wheel angle, and moving the steering wheel in a first direction until predetermined angular movement of at least one of the road wheels is sensed. In response measurement is started of the steering wheel angle change. The steering wheel is then moved in a second direction opposite of the first direction until predetermined angular movement of at least one of the road wheels is sensed and in response measurement of the steering wheel angle change is completed. An indication that the vehicle has excessive steering wheel lash is given if the change in steering wheel angle exceeds a predetermined amount.

In a sixth embodiment of the present invention, a method of testing suspension play for acceptability in a vehicle having a steering wheel and two front wheels includes the steps of applying a first force to the front wheels, which force tends to move the wheels in a toe-in direction, measuring and recording total toe of the front wheels while the first force is applied, applying a second force to the front wheels, which second force tends to move the wheels in a toe-out direction, measuring and recording the total toe of the front wheels while the second force is applied, and indicating that the vehicle has excessive suspension play if the difference between the recorded values of the total toe while the first and second forces are applied is greater than a predetermined value.

BRIEF DESCRIPTION OF THE DRAWINGS

Similar reference characters indicate similar parts throughout the various views of the drawings.

DESCRIPTION OF THE PREFERRED EMBODIMENT

Figure 1:
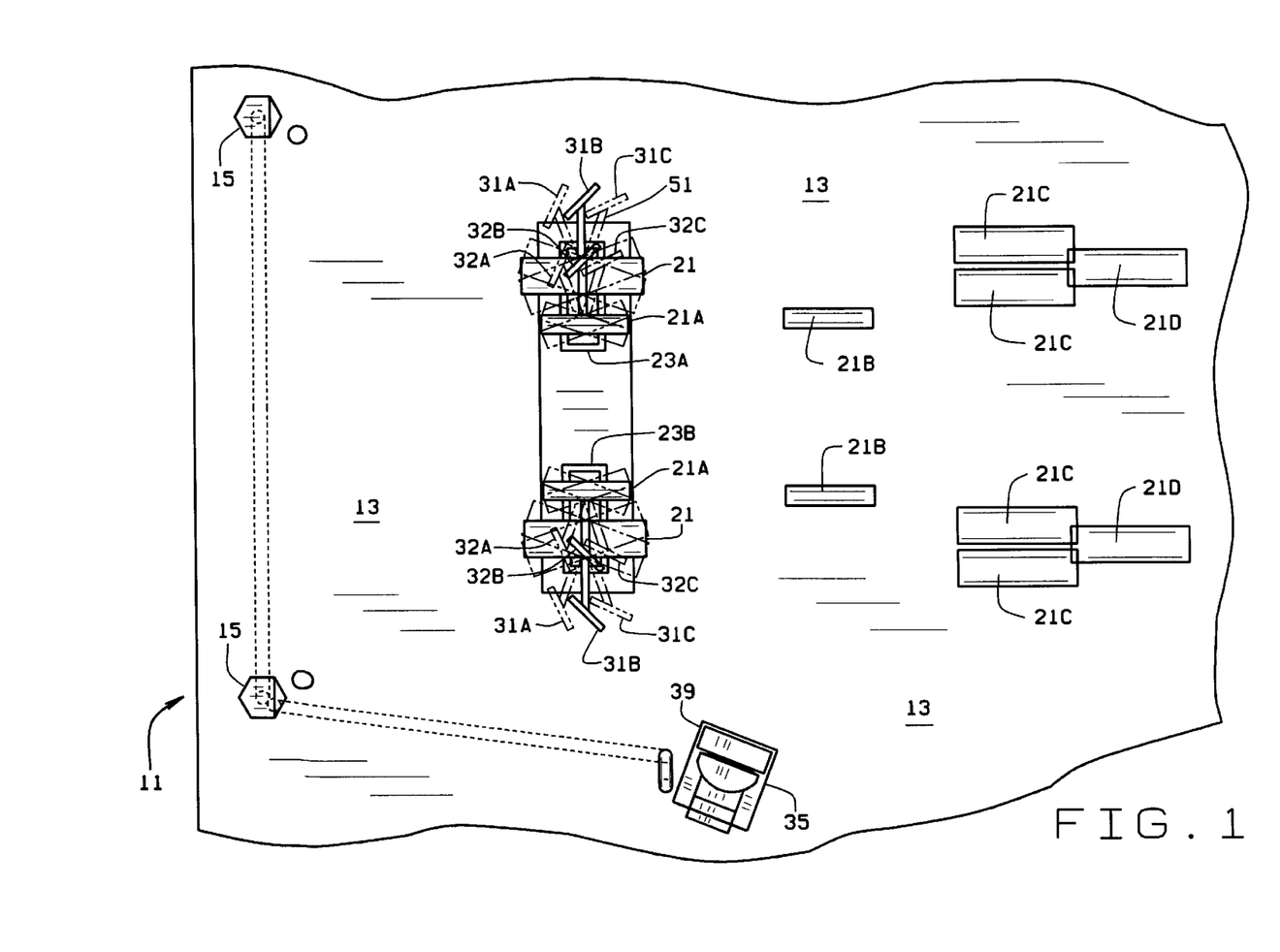
FIG. 1 is a top plan view of the apparatus of the present invention.
Figure 1A:
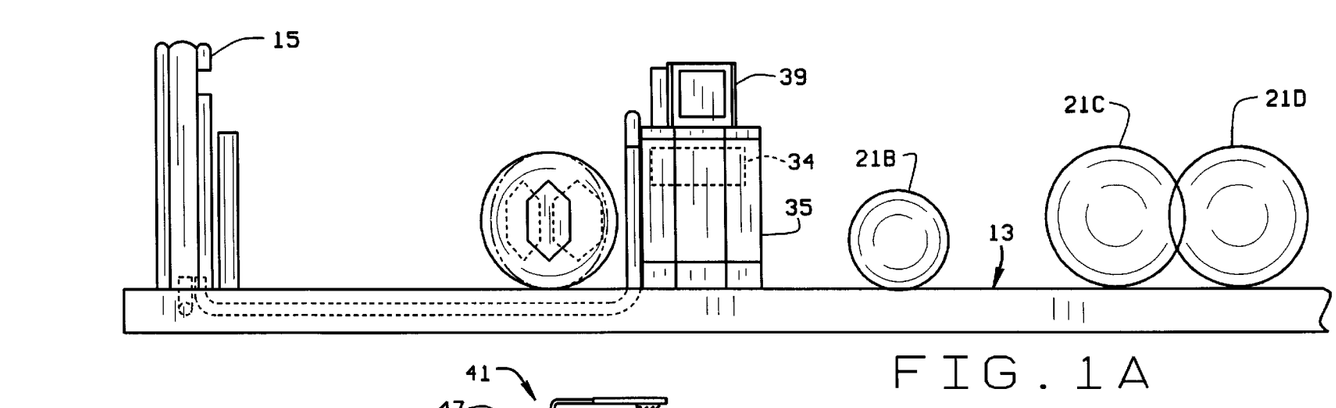
FIG. 1A is a side elevation of the apparatus of FIG. 1.

Turning now to the drawings, there is shown in FIGS. 1 and 1A a system 11 of the present invention for detecting steering lash and suspension play. System 11 preferably includes a relatively flat surface 13 upon which a vehicle to be tested may be driven. At the front of surface 13 and extending vertically therefrom are a pair of posts 15, positioned to be on opposite sides of the vehicle to be tested. Posts 15 each have disposed therein a camera (or like device) for obtaining images of optical targets as described below. Alternatively, the present system and method can be implemented using conventional angle sensors, since the present invention is not dependent upon how the road wheel angles are obtained. For clarity of explanation, optical targets are described throughout, but it must be understood that replacement of the optical targets and cameras with conventional angle sensors and accompanying circuitry is contemplated as being particularly useful in this invention as well.

Shown in FIG. 1 are the positions where vehicles of various sizes are located on surface 13 during the testing procedure. In all cases, the front wheels 21 (or 21A in the case of a small car) are disposed on a high friction surface 23A and 23B, which is preferably an expanded metal meshwork for increasing the friction between the tires and the surface. These high friction surfaces are preferably mounted in a concrete slab. Each surface 23A and 23B is preferably has a painted outline to facilitate the proper placement of the vehicle for testing. The locations of the rear wheels for vehicles of various sizes are also shown in FIG. 1 and labeled 21B (for small cars), 21C (for dual rear wheel pick up trucks), and 21D (for extended cab pick up trucks). The positions of the rear wheels are not of particular importance to the present invention and are not indicated on surface 13 to the user in practice. They are shown here simply to give a better understanding of the various sizes of vehicles which can be accommodated by the present apparatus.

An optical target 31 is mounted on each front wheel. Although FIG. 1 appears to show six optical targets on each side, in fact what is illustrated is a single target for each front wheel moving with the wheel to three different positions, labeled 31A, 31B, and 31C. For clarity the optical target for the small car wheels is labeled 32, although it should be understood that exactly the same optical targets can be used on any size vehicle.

The sensor elements of the present invention consist of the optical targets 31 mounted to the front vehicle wheels and one or more cameras 15 or other image sensing devices which are made to view the optical targets, although as mentioned above, conventional sensors and circuitry could also be used without departing from the scope of the present invention. WO document 94/05969 (discussed previously), the full disclosure of which is incorporated herein by reference, describes one method of determining wheel alignment angles from such apparatus. Other methods are disclosed in the co-assigned patents discussed above.

For purposes of the present invention, the term camera is used herein to refer to any such image sensing device. The images of the targets are obtained in cameras 15 and the signals from the cameras are supplied to a computer 34 where the images are processed to determine the various alignment angles. Although computer 34 is shown as physically separated from the cameras and disposed in a console 35, this is for purposes of illustration only. The computer may be disposed in the same housing as one or more of the cameras or in any convenient place.

Computer 34, in a manner which is well-known in the art, takes the signals from the cameras and computes various alignment angles for the vehicle under test. The process of calculating the alignment angles may be done in many ways, such as shown in U.S. Pat. No. 5,488,472, and U.S. Pat. Nos. 5,675,515 and 5,724,128, the disclosures of which are incorporated herein by reference.

Specifically, in the present invention the total toe on the front axle (the total toe of wheels 21) is calculated, as is the steer ahead angle. As is known, the steer ahead angle or steer ahead is determined by comparing the toe of the front wheels to a reference such as the thrust line of the vehicle or the center line of the testing area.

As is clear most clearly in FIG. 1A, console 35 has a display 39 disposed at the top thereof in a position where it may readily be observed by a user/operator setting in the driver's seat of the vehicle. Display 39 is used to guide the operator through the testing procedure described below.

Figure 2:
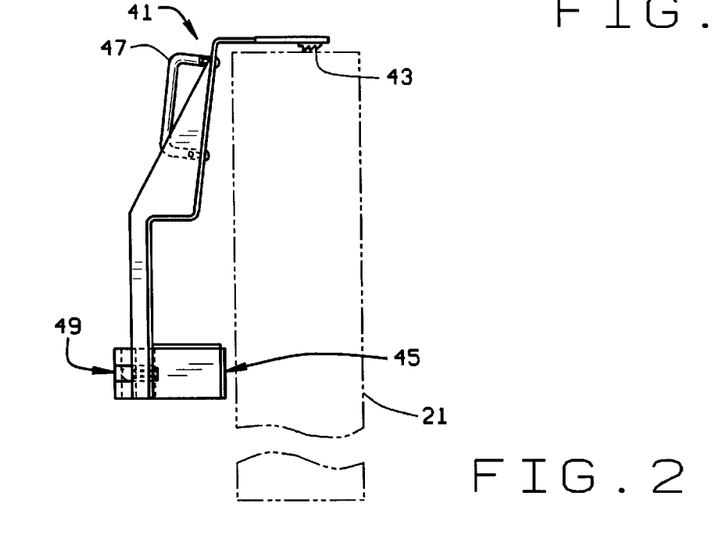
FIG. 2 is a side view of a target hanger used in the present invention.

Turning to FIG. 2, a hanger 41 is shown for removably hanging or mounting a target 31 on the front wheel. The hangers for both sides of the vehicle are identical, so only one will be described. Hanger 41 includes a flat top portion 42 ending in a friction member, such as the claw 43 shown, for grabbing the top of the wheel/tire assembly 21. For convenience, the wheel 21 is shown in phantom in FIG. 2. At the bottom, hanger 41 includes a pair of flat surfaces 45 (see FIG. 3 to see the location of both surfaces 45) which rest against the side of the wheel in use. It should be noted that there is no requirement in the present invention for the targets to be mounted to the wheels in any precise geometrical relationship. The targets are simply hung onto the wheels by means of hangers 41 and measurements are taken. This is because, unlike conventional alignment equipment, the present invention requires the measurement of relative angles only. So long as the hangers do not slip during measurement, the proper measurements can be taken.

Figure 3:
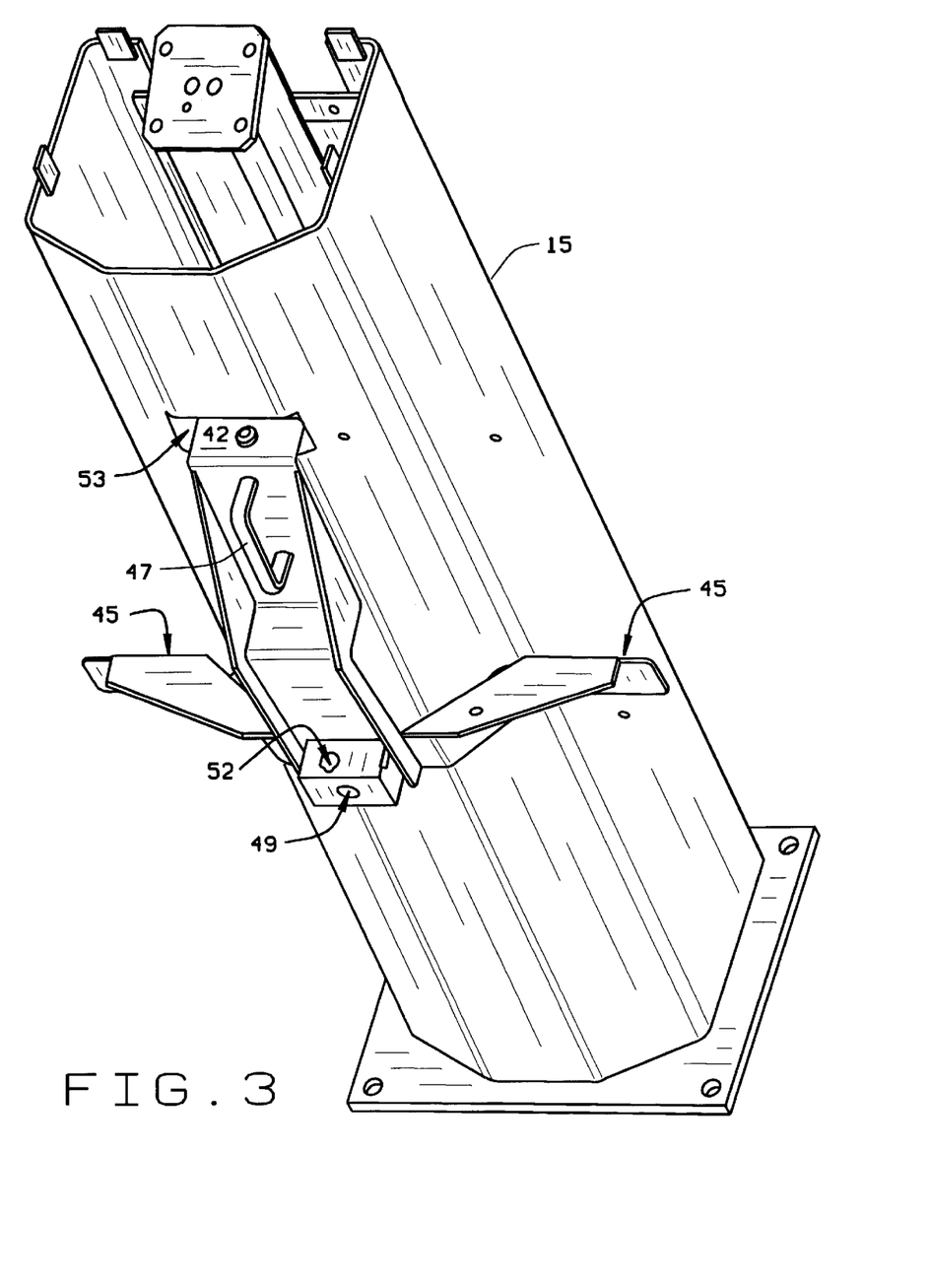
FIG. 3 is a perspective view showing a target hanger mounted on a camera post used in the present invention.

Hanger 41 also includes a handle 47 connected to the body of the hanger to facilitate installation and removal of the hanger on the wheel. At the bottom of hanger 41, intermediate flat surfaces 45, is an opening 49 sized to receive the shaft 51 of optical target 31. Similarly, an opening 52 is provided in the hanger for mounting a flag to the hanger which extends upwardly enough so that the operator can readily determine that the hanger is still mounted on the wheel. As can be seen in FIG. 3, each post 15 preferably includes an opening 53 into which the flat top portion 42 of hanger 41 may be inserted for storage of the hanger when not in use.

Figures 4, 4A:
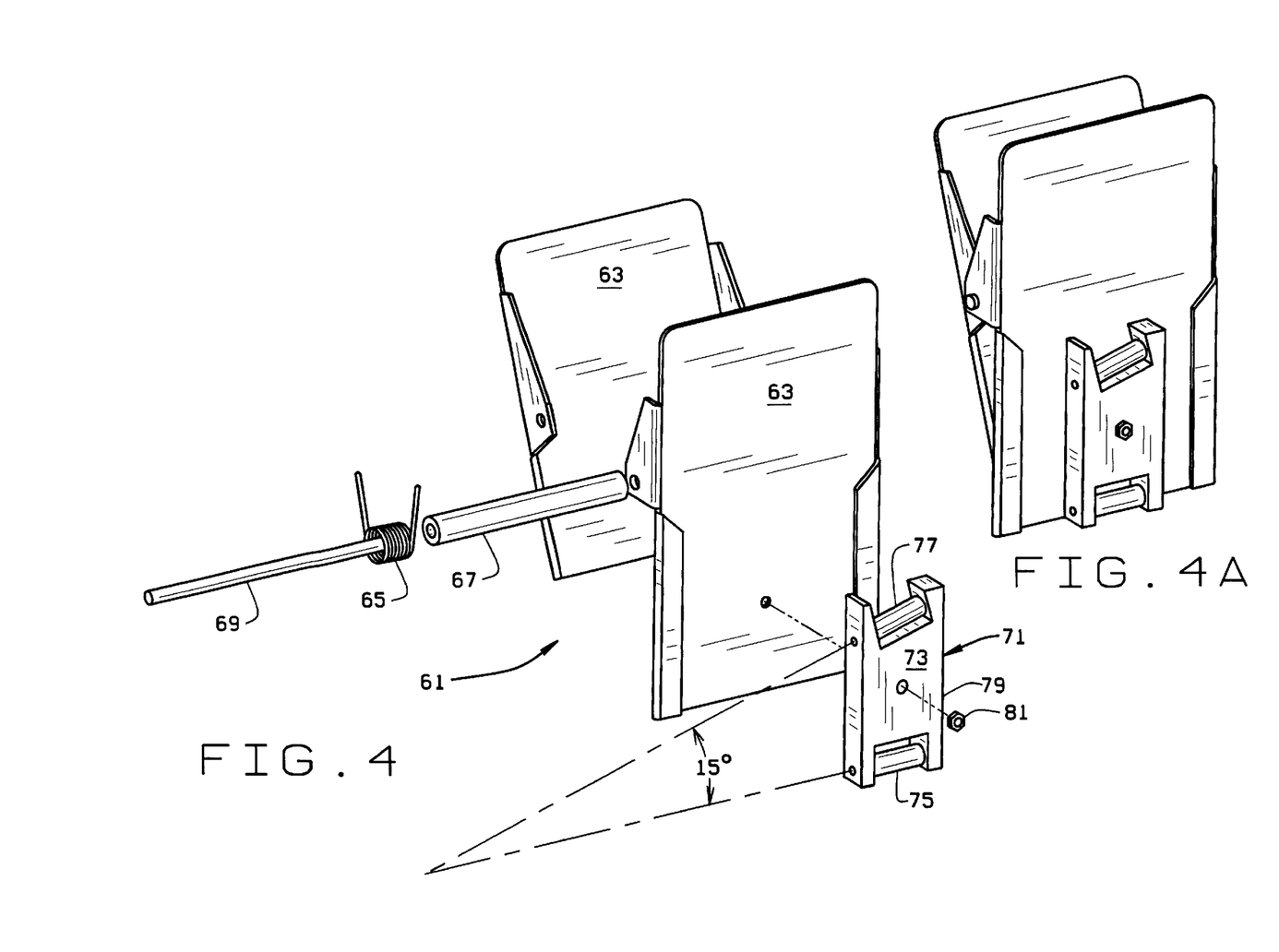
FIG. 4 is an exploded view of a steering angle fixture used in the present invention.
FIG. 4A is a perspective view of the steering angle fixture of FIG. 4.

Turning to FIG. 4, there is shown a steering angle fixture 61 of the present invention. Fixture 61 is constructed to be easily clamped on the steering wheel of the vehicle under test by means of two ears 63 which are held in a clamping position by a spring 65 disposed about a bushing 67. A rod 69 extends through holes in each side of the ears to hold the assembly in place. The assembled fixture 61 is shown in FIG. 4A.

A second portion 71 of fixture 61 is used to accurately indicate the movement of the steering wheel about a predetermined angle such as fifteen degrees. Second portion 71 includes a fixed body 73 on which are mounted two bubble levels 75 and 77. The body 73 itself is rotatable about an axis (indicated by the dashed line 79 so that the first bubble level may be set as described below. Once the user has set the body in a desired position, a thumb nut 81 is used to tighten the second portion against further rotation with respect to the clamping portion of the fixture. Alternatively, if the second portion has enough friction with respect to the clamping portion to prevent inadvertent rotation of the second portion, there would be no need to tighten the thumb nut 81. As an alternative to the use of fixture 61, an electronic steering wheel angle sensor could be used.

Figure 5:
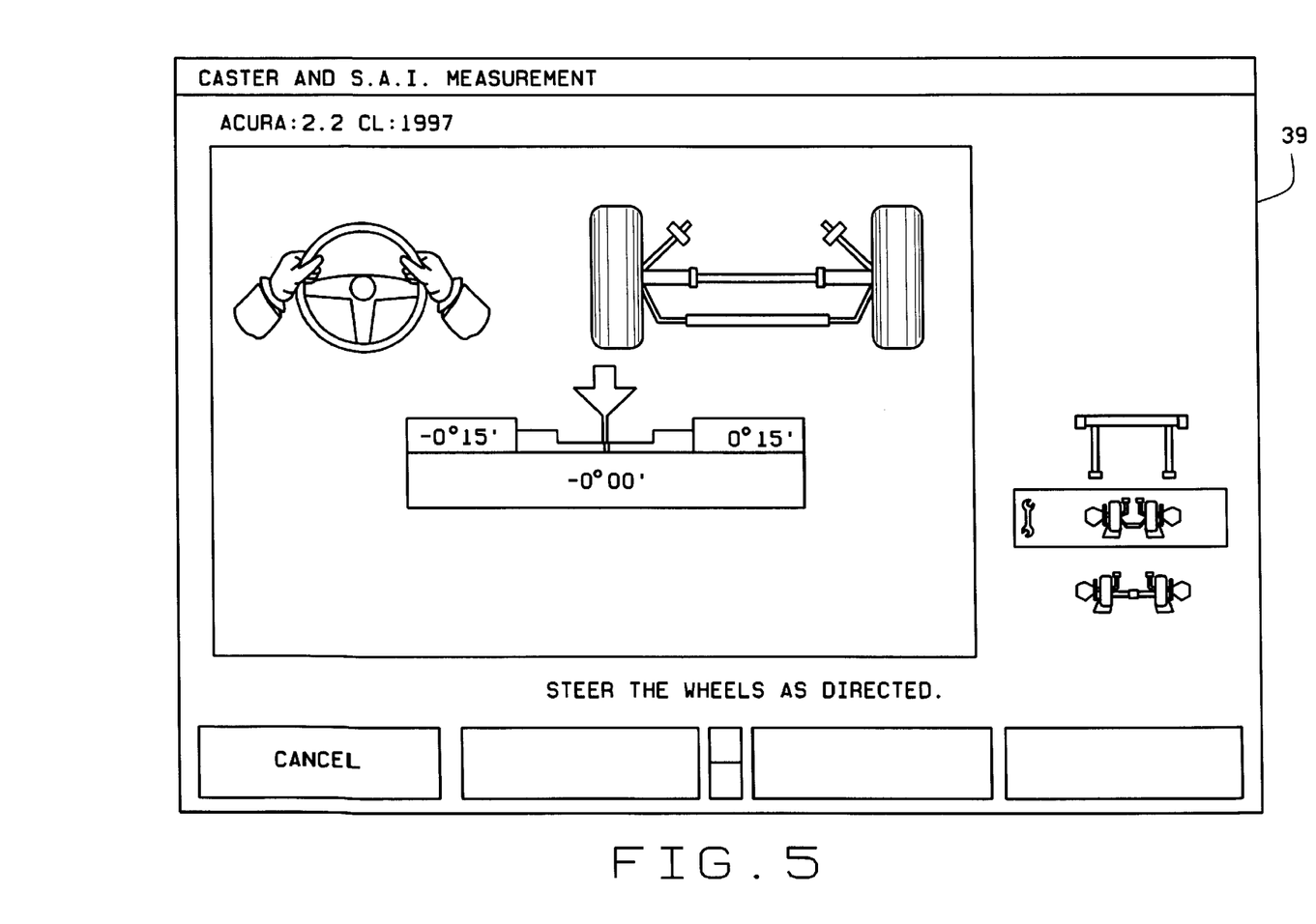
FIGS. 5 and 6 are illustrative screen displays used to guide the operator in performing the method of the present invention.

The apparatus of the present invention is used to detect steering wheel lash and suspension play as follows:

The operator drives the vehicle to be tested to the test position with the front wheels 21 centered on the high friction plates 23A and 23B with the wheels pointed roughly straight ahead. Using hangers 41, the targets 31 are quickly hung on both front wheels. The display then instructs the operator to steer the steering wheel until the steer ahead bar graph display as shown in FIG. 5 is zero. It should be understood that all the steps can be illustrated to the operator in a similar manner using bar graphs similar to that shown in FIG. 5 with suitable written instructions displayed as well if desired.

Figure 6:
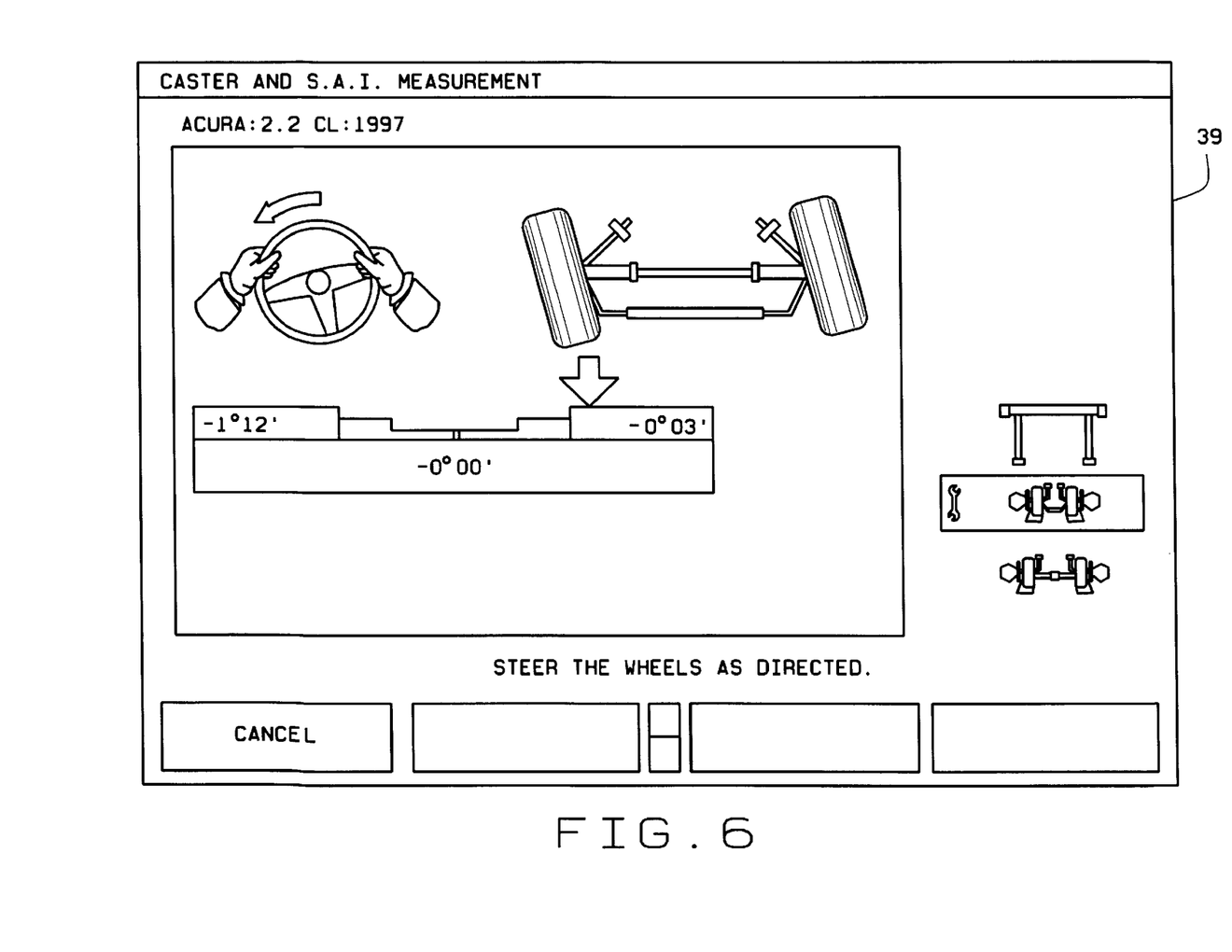

Fixture 61 is attached to the top of the steering wheel using clamping ears 63. Then the operator is instructed to steer to the left slowly until the steer ahead angle just starts to move. Such an instruction is shown in FIG. 6. At that point, the computer records the steer ahead reading. The operator holds the steering wheel in this position while rotating the second portion 71 of the fixture until bubble level 75 is level. Portion 71 is then set in the desired position, and thumb nut 81 tightened, if necessary.

The operator then steers to the right, under instruction from the console if desired, until bubble level 77 is level. At this point the steering wheel has been moved fifteen degrees. The operator stops moving the steering wheel and the computer records the steer ahead measurement at this steering wheel position. It has been found that if the steer ahead angle does not change by at least 0.1 degree during this procedure then the steering lash is excessive and the vehicle fails the test. If the steer ahead angle does change by 0.1 degree or more, then the vehicle has passed the steering lash test.

Alternatively, steering wheel lash may be tested by moving the road wheels to predetermined positions and determining if the steering wheel was moved more than a predetermined amount to cause the corresponding movement of the road wheels. If so, there is excessive lash. For example, if an electronic steering wheel angle gauge is used, this procedure is fairly simple. The steering wheel is moved in one direction (e.g., to the left) until a predetermined angular position is reached. Preferably this predetermined angular position of the road wheels is just when the road wheels begin to move. The steering wheel is then moved in the opposite direction (e.g., to the right) until a second predetermined angular position is reached. Again, this position is preferably when the road wheels just begin to move. The steering wheel angle at that point is compared to the steering wheel angle at the first position. If there is excessive lash, the steering wheel angle will exceed a predetermined angle. If there is not excessive lash, the steering wheel angle will not. It should be realized that using the positions at which the road wheels just begin to move is advantageous, since practically all the change in the steering wheel angle in that case is due to steering wheel lash.

To test suspension play with the present apparatus, the road wheels 21 are then steered a predetermined amount, such as 1.0 degree to the left and the computer records total toe. The operator then turns the wheels through zero to the right until a 1.0 degree turn angle to the right is reached. The computer at that point records total front toe for this new position. If the difference between the total front toe measured at the left and right positions is less than a predetermined value, such as 0.4 degrees, then the vehicle passes the suspension play test.

Figure 7:
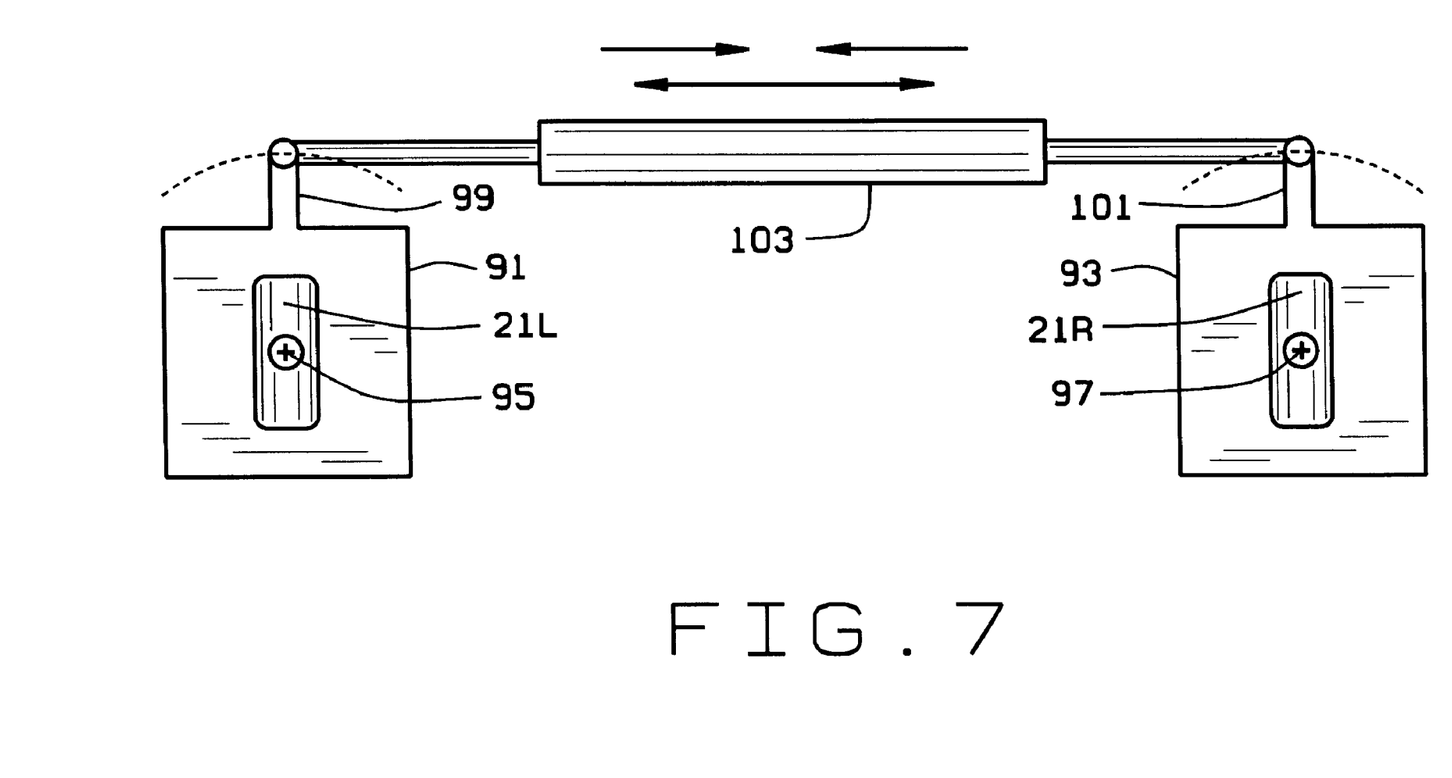
FIG. 7 is a simplified plan view illustrating an alternative embodiment for detecting excessive play in the vehicle suspension.

Suspension play may also be tested using the apparatus of FIG. 7. In this embodiment of the present invention, the left and right front wheels (labeled 21L and 21R, respectively) are driven onto high friction surface plates 91, 93. Each plate is surface of flush mounted with respect to the floor and is adapted to rotate about respective axes of rotation 95, 97. Each plate includes an extension 99, 101, preferably mounted at or below floor level which are secured to opposite ends of a double acting air or hydraulic cylinder 103. When the cylinder is actuated to draw the fronts of plates 91 and 93 toward each other, as indicated by the top set of arrows, this tends to move the wheels toward a toe-in condition and puts the linkage in tension. The total toe is measured at this time. The cylinder is then actuated to push the fronts of plates 91 and 93 apart, as indicated by the bottom arrow above the cylinder. This tends to move the wheels toward a toe-out condition and puts the linkage in compression. The total toe is also measured at this point. The difference between the toe-in and toe-out measurements is greater when the suspension components associated therewith are loose. When this difference exceeds a threshold, the vehicle has excessive play and the technician is notified.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method of testing steering wheel lash for acceptability in a vehicle having a steering wheel, the method comprising:

securing a steering angle fixture to the steering wheel, said steering angle fixture having an indicator for indicating whether the steering wheel has been moved a predetermined angle;

moving the steering wheel to a first rotational position, recording the steer ahead angle at the first rotational position, said steer ahead angle at the first rotational position being a first steer ahead angle, and setting the steering angle fixture at a predetermined fixture position;

moving the steering wheel to a second rotational position at which the indicator indicates that the steering wheel has been moved the predetermined angle, and recording the steer ahead angle at the second rotational position, said steer ahead angle at the second rotational position being a second steer ahead angle;

indicating that the vehicle has excessive steering wheel lash if the difference between the first and second steer ahead angles is less than a predetermined amount.

2. The method of testing steering wheel lash as set forth in claim 1 wherein the steering wheel is initially steered to approximately zero degrees.

3. The method of testing steering wheel lash as set forth in claim 1 wherein the steering angle fixture is rotatable about an axis thereof when said fixture is mounted on the steering wheel.

4. The method of testing steering wheel lash as set forth in claim 3 wherein the steering angle fixture is rotationally fixable in at least one position.

5. The method of testing steering wheel lash as set forth in claim 1 wherein the steering angle fixture has a zero position, said predetermined fixture position being the zero position and said steering angle fixture being fixable in the zero position by a user.

6. The method of testing steering wheel lash as set forth in claim 1 wherein the indicator is a visual indicator.

7. The method of testing steering wheel lash as set forth in claim 1 wherein the indicator is a mechanical indicator.

8. The method of testing steering wheel lash as set forth in claim 1 wherein the predetermined angle of steering wheel movement is greater than 10 degrees.

9. The method of testing steering wheel lash as set forth in claim 8 wherein the predetermined angle of steering wheel movement is approximately 15 degrees.

10. The method of testing steering wheel lash as set forth in claim 1 wherein there is an indication of excessive steering wheel lash if the difference between the first and second steer ahead angles is less than approximately 0.2 degrees.

11. The method of testing steering wheel lash as set forth in claim 10 wherein there is an indication of excessive steering wheel lash if the difference between the first and second steer ahead angles is less than approximately 0.1 degrees.

12. The method of testing steering wheel lash as set forth in claim 1 wherein the steer ahead angles are measured using visual targets mounted on the front wheels of the vehicle.

13. The method of testing steering wheel lash as set forth in claim 12 wherein the visual targets are mounted on the front wheels without substantial restraint against rotational movement of the wheels about the axes of the wheels.

14. The method of testing steering wheel lash as set forth in claim 12 further including at least one camera per side of the vehicle to image the visual targets.

15. The method of testing steering wheel lash as set forth in claim 1 further including providing friction plates, and positioning the front wheels of the vehicle upon the friction plates.

16. The method of testing steering wheel lash as set forth in claim 1 wherein the steer ahead angles are measured using sensor elements mounted on the front wheels of the vehicle, further including visual warning elements affixed in a known relationship to the sensor elements, said visual warning elements being visible to a user disposed in a driver's seat of the vehicle.

17. The method of testing steering wheel lash as set forth in claim 1 wherein the first rotational position is that position at which the steer ahead angle starts to change.

18. A method of testing suspension play for acceptability in a vehicle having a steering wheel and two front wheels, the method comprising:
  moving the front wheels to a first predetermined steer ahead angle;
  measuring and recording total toe of the front wheels at the first predetermined angle;
  moving the front wheels to a second predetermined steer ahead angle;
  measuring and recording the total toe of the front wheels at the second predetermined angle;
  indicating that the vehicle has excessive suspension play if the difference between the recorded values of the total toe at the first and second predetermined angles is greater than a predetermined value.

19. The method of testing suspension play as set forth in claim 18 wherein the first and second predetermined angles are equally spaced from the longitudinal axis of the vehicle.

20. The method of testing suspension play as set forth in claim 19 wherein the magnitude of the first and second predetermined angles with respect to the longitudinal axis of the vehicle is less than five degrees.

21. The method of testing suspension play as set forth in claim 19 wherein the magnitude of the first and second predetermined angles with respect to the longitudinal axis of the vehicle is approximately one degree.

22. The method of testing suspension play as set forth in claim 18 wherein the total toe is measured at equal angles to the left and right with respect to the longitudinal axis of the vehicle.

23. The method of testing suspension play as set forth in claim 18 wherein the predetermined value for indicating excessive play is approximately 0.4 degrees.

24. The method of testing suspension play as set forth in claim 18 wherein the angles of the front wheels with respect to the longitudinal axis of the vehicle are measured using visual targets mounted on the front wheels of the vehicle.

25. The method of testing suspension play as set forth in claim 24 wherein the visual targets are mounted on the front wheels without substantial restraint against rotational movement of the wheels about the axes of the wheels.

26. The method of testing suspension play as set forth in claim 24 further including at least one camera per side of the vehicle to image the visual targets.

27. The method of testing suspension play as set forth in claim 18 further including providing friction plates, and positioning the front wheels of the vehicle upon the friction plates.

28. The method of testing suspension play as set forth in claim 18 wherein the angles of the front wheels with respect to the longitudinal axis of the vehicle are measured using sensor elements mounted on the front wheels of the vehicle, further including visual warning elements affixed in a known relationship to the sensor elements, said visual warning elements being visible to a user disposed in a driver's seat of the vehicle.

29. A method of testing steering wheel lash for acceptability in a vehicle having a steering wheel and at least first and second front road wheels, the method comprising:
  securing a steering angle sensing element to the steering wheel, said steering angle sensing element being adapted to determine change in the steering wheel angle;
  moving the steering wheel in a first direction until predetermined angular movement of at least one of the road wheels is sensed;
  commencing measurement of the steering wheel angle change;
  moving the steering wheel in a second direction opposite of the first direction until predetermined angular movement of at least one of the road wheels is sensed;
  completing measurement of the steering wheel angle change; and
  indicating that the vehicle has excessive steering wheel lash if the change in steering wheel angle exceeds a predetermined amount.

30. The method as set forth in claim 29 wherein the predetermined angular movement of the road wheels is the commencement of angular movement of at least one of the road wheels.

31. A method of determining whether a vehicle is alignable, the method comprising:
  moving the front wheels to a first predetermined wheel angle;
  measuring and recording a total toe of the front wheels at the first predetermined wheel angle;

moving the front wheels to a second predetermined wheel angle;

measuring and recording the total toe of the front wheels at the second predetermined wheel angle;

indicating that the vehicle may not be alignable if the difference between the recorded values of the total toe at the first and second predetermined wheel angles is greater than a predetermined value.

32. Apparatus for testing steering wheel lash of a vehicle having a steering wheel and first and second front wheels, comprising:

a first sensing element adapted to be placed on the first front wheel of the vehicle;

a second sensing element adapted to be placed on the second front wheel of the vehicle;

at least one system responsive to the first and second sensing elements for computation of wheel alignment angles of the first and second front wheels; and a steering angle fixture adapted to be secured to the steering wheel of the vehicle, said steering angle fixture having a first portion which is securable against relative movement with respect to the steering wheel and a second portion which is rotationally adjustable with respect to the first portion;

said steering angle fixture further having an indicator for indicating when the steering wheel is moved from a first angular position to a second angular position, the second angular position being predetermined with respect to the first angular position, the second portion of said steering angle fixture being fixable against rotation with respect to the first portion thereof so that the user may set the first angular position.

33. The apparatus for testing steering wheel lash as set forth in claim 32 wherein the steering angle fixture includes first and second level indicators, said first and second level indicators being disposed with respect to each other at an angle corresponding to the difference between the first and second angular positions.

34. The apparatus for testing steering wheel lash as set forth in claim 33 wherein the first and second level indicators are disposed at angles of approximately fifteen degrees with respect to each other.

35. The apparatus for testing steering wheel lash as set forth in claim 32 wherein the first and second sensing elements are optical targets.

36. The apparatus for testing steering wheel lash as set forth in claim 35 wherein each optical target is disposed on its own hanger which is hung over the corresponding first and second front wheels.

37. The apparatus for testing steering wheel lash as set forth in claim 35 wherein the computation system includes at least one camera per side of the vehicle to obtain images of the targets for computation of wheel alignment angles of the first and second front wheels.

38. The apparatus for testing steering wheel lash as set forth in claim 37 wherein the cameras are mounted on posts disposed to the sides of the vehicle, said posts being adapted to hold at least one of the hangers when said hangers are not in use.

39. A method of testing suspension play for acceptability in a vehicle having a steering wheel and two front wheels, the method comprising:

applying a first force to the front wheels, said force tending to move the wheels in a toe-in direction;

measuring and recording total toe of the front wheels while the first force is applied;

applying a second force to the front wheels, said second force tending to move the wheels in a toe-out direction;

measuring and recording the total toe of the front wheels while the second force is applied;

indicating that the vehicle has excessive suspension play if the difference between the recorded values of the total toe while the first and second forces are applied is greater than a predetermined value.

40. The method of testing suspension play as set forth in claim 39 wherein the first force is applied before the second force is applied.

* * * * *